United States Patent
Fugitt

[11] 3,743,380
[45] July 3, 1973

[54] POLARIZED LIGHT SOURCE FOR UNDERWATER USE

[75] Inventor: Ronald Bruce Fugitt, San Diego, Calif.

[73] Assignee: The United States of America as represented by the Secretary of the Navy, Washington, D.C.

[22] Filed: Jan. 31, 1972

[21] Appl. No.: 222,179

[52] U.S. Cl. ............ 350/152, 240/9.5, 350/157, 350/172
[51] Int. Cl. ............................................. G02b 5/30
[58] Field of Search ............... 350/147, 152, 157, 350/169; 240/9.5; 250/199

[56] References Cited
UNITED STATES PATENTS

| | | |
|---|---|---|
| 2,821,114 | 1/1958 | Wiemer et al. ............ 350/152 |
| 3,510,198 | 5/1970 | Pace ............................ 350/152 |
| 2,887,566 | 5/1959 | Marks .......................... 350/152 |
| 2,476,014 | 7/1949 | Wright ......................... 350/152 |
| 3,153,740 | 10/1964 | Murphy ....................... 350/152 |
| 3,278,753 | 10/1966 | Pitts et al. ................... 250/199 |

*Primary Examiner*—John K. Corbin
*Attorney*—Richard S. Sciascia, Ervin F. Johnston and John Stau

[57] ABSTRACT

A circularly polarized underwater light source comprising: a conventional unpolarized light source with a well-collimated output; an efficient optical polarizer, which employs multilayer interference polarization, total internal reflection, birefringent quarter-wave plates; and anti-reflection coatings; a lens to control the extent of the divergence of the illuminating beam; and an underwater housing with a dome-shaped window designed to withstand external hydrostatic pressures, part of the winding forming the lens.

10 Claims, 6 Drawing Figures

Detail of Beam Splitter

Circular Light Polarizer

FIG. 3A. TOP VIEW

FIG. 3B. SIDE VIEW

CIRCULARLY-POLARIZED UNDERWATER LIGHT SOURCE.

OPTICAL ELEMENTS OF A PRISM-LESS CIRCULAR POLARIZER.

3,743,380

POLARIZED LIGHT SOURCE FOR UNDERWATER USE

STATEMENT OF GOVERNMENT INTEREST

The invention described herein may be manufactured and used by or for the government of the United States of America for govermental purposes without the payment of any royalties thereon or therefor.

BACKGROUND OF THE INVENTION

A primary purpose of this invention is to provide an efficient means of producing polarized illumination for underwater lighting applications. It utilizes large aperture polarizers of the interference type which can be constructed by vapor deposition of high refractive index films onto lower index dielectric substrates (such as glass). With the correct incidence angle and film thickness, the reflected light is completely polarized, and the transmitted portion may be completely polarized also, if a sufficient number of films are employed. This type of polarizer requires no air spaces and can be designed for submerged operation.

Early attempts to use artificial lighting in underwater viewing applications have been limited by the particles in the underwater medium, which curtail vision by scattering the light back to the observer or the photo-optical receiver. Attempts to reduce the quantity of backscattered light reaching these receivers have resulted in the development of such advanced viewing systems as volume scanning, range gating, and polarization enhancement. Of these advanced viewing systems, polarization enhancement is the simplest and easiest to implement.

The polarization enhancement system involves the use of a polarized light source and a polarization analyzer. The light reflected from the particles in the water retains its polarization while the light returning from rough or painted surfaces becomes depolarized. The polarization analyzer blocks the polarized light returning from the medium and transmits half of the depolarized target light. Since the target light is attenuated less than the backscatter, the apparent contrast of the target will be improved and it will be visible at greater distances. Either linearly or circularly polarized light could be used, but for the linear polarization case, an orientation using crossed axes must be maintained between the polarizer and analyzer. With circularly polarized light this restriction does not apply.

The major problem encountered in implementing the polarization technique is that of obtaining an efficient polarized source of illumination. An attempt to solve this problem resulted in the invention herein disclosed.

Previous methods for producing this type of polarized light involved the use of an ordinary light source with a dichroic polarizer, such as a sheet of Polaroid material, mechanically affixed in front of the lamp. The polarizer passes the portion of the light which has its electric vector oriented along the axis of the polarizer and absorbs the portion not oriented in this direction. The result is that half of the light emitted by the source is absorbed by the polarizing material. The actual efficiency of most dichroic polarizers is about 20 – 35 percent, being less than the 50 percent maximum theoretical efficiency. This power absorption is a definite disadvantage for use on battery-operated submersible vehicles.

A properly constructed polarizer of the type herein described should be nearly 100 percent efficient for a reasonably wide range of incident wavelengths.

SUMMARY OF THE INVENTION

Operation of the invention is as follows. Unpolarized light from a collimated light source passes into a polarizer, with minimum reflection loss due to an anti-reflection coating on the entrance face. Each ray of light is then divided into two polarized portions by non-absorbing multilayer films, such as described in the prior art. The light which is deflected by 90° is totally reflected at the glass-air interface (no absorption) such that it is traveling parallel to its original direction. The nondeviated component and the twice-deviated component then pass through birefringent quarter-wave plates oriented such that both beams become circularly polarized with the same rotation sense. Reflection loss at the exit face of the polarizer is minimized with another anti-reflection coating. The "V" shape of the polarizing films yields a compact and symmetrical design. The polarized light may then pass through a lens which controls the spread of the illuminating beam, and through a dome window which is part of the underwater pressure housing.

OBJECTS OF THE INVENTION

An object of the invention is to provide a light polarizer with optimal efficiency in converting unpolarized to polarized light.

Another object of the invention is to provide a circularly-polarized light source in surroundings where much backscattering is present.

Yet another object is to provide a light source which is easily portable.

Other objects, advantages, and novel features of the invention will become apparent from the following detailed description of the invention, when considered in conjunction with the accompanying drawings, wherein:

DESCRIPTION OF THE PREFERRED EMBODIMENTS

Figure 1:
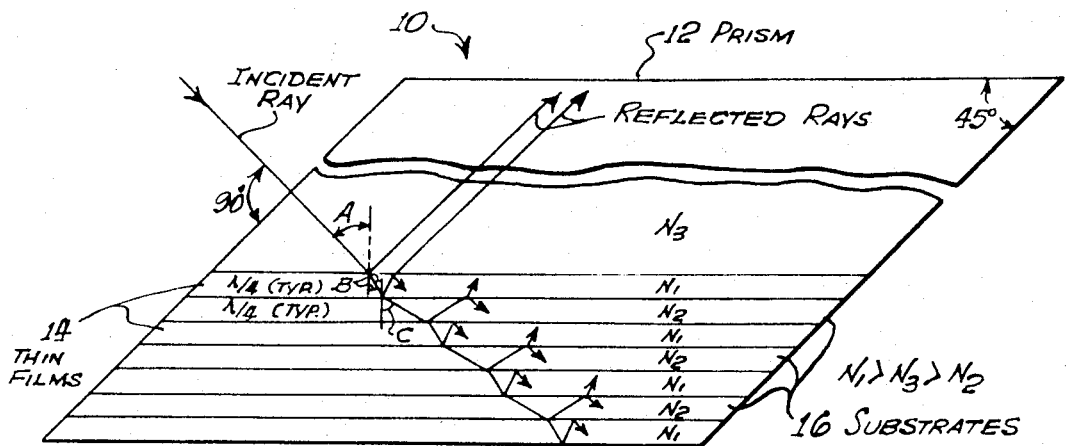
FIG. 1 is a side view of the beam splitter, a key element of the invention.

Referring now to FIG. 1, therein is shown a beam splitter 10 comprising a prism 12 having an index of refraction $N_3$, and several thin films 14, having an index of refraction $N_1$, interleaved with several thin substrates 16 having an index of refraction $N_2$. It will be noted that $N_1 > N_3 > N_2$.

For detailed information on beam splitters of the type used in this invention, reference is directed to U.S. Pat. No. 2,403,731, to S. M. McNeille, dated July 9, 1946.

Typical parameter values for the three elements 12, 14 and 16 are: the prism 12 may be glass having an index or refraction of 1.69; the thin film 14 may be zinc sulfide having an index of 2.40; and the substrate 16 may be evaporated magnesium fluoride having an index of 1.38.

It will be noted that angle A = 45° is not the brewster angle for the index of refraction of the prism 12. However, essentially, the reflected and refractd light are completely polarized.

Figure 2:
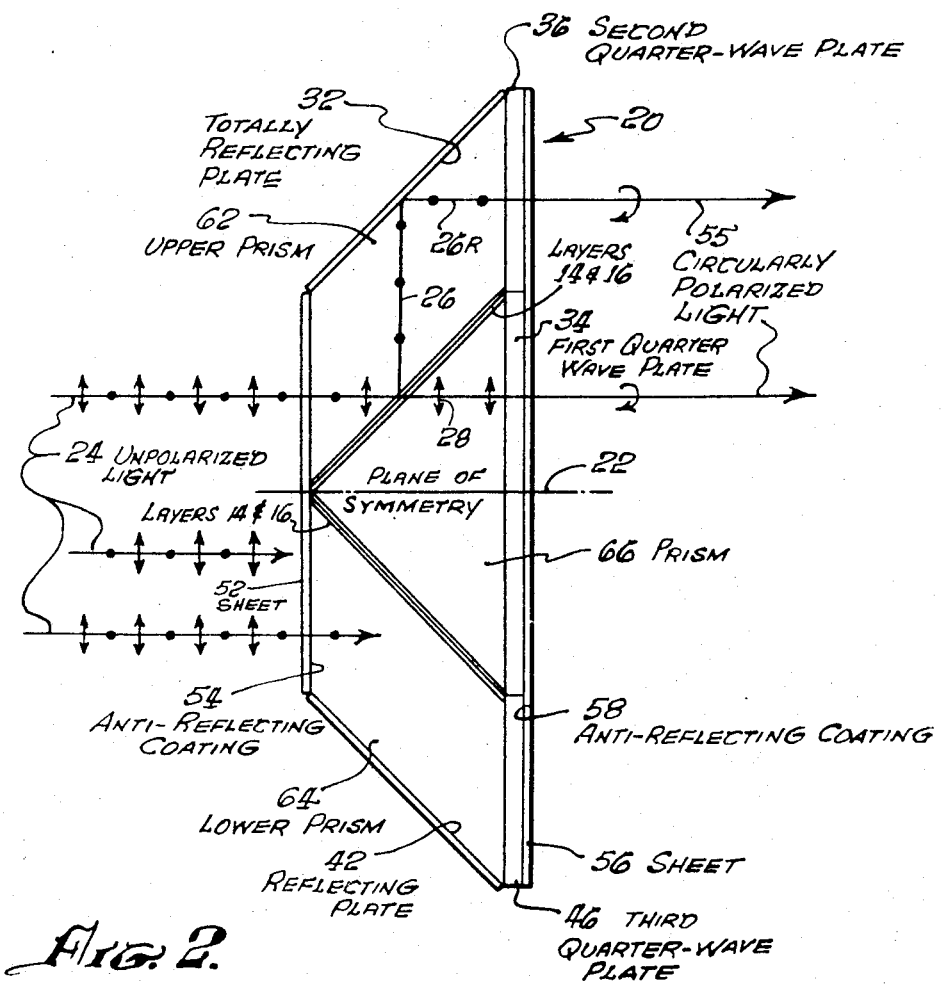
FIG. 2 is a side view of the circular light polarizer of this invention.

Referring now to FIG. 2, this figure shows a light polarizer 20 for use in an illuminating system with an unpolarized light source, not shown, particularly useful in an environment where backscattering from a target illuminated by the polarized light is a factor which must be taken into consideration. The light polarizer 20 comprises a polarizing beam splitter, in the form of transparent parallel layers 14 and 16, making an angle, for example, of 45°, with a reference plane of symmetry 22 such that unpolarized, incident light 24, parallel to both the plane of symmetry and a cross section through the beam splitter, becomes polarized and is half reflected by the beam splitter, so that the plane of polarization of the reflected light 26 is parallel to the plane of symmetry, and half transmitted through the beam splitter, with the plane of polarization 28 perpendicular to the plane of symmetry.

Whereas FIG. 1 shows a beam splitter 10 which includes a prism 12, for beam splitting the prism is not absolutely essential. The beam splitter may simply comprise a multilayer material wherein each layer consists of a material having a different index of refraction from a layer adjacent to it. For example, as is shown in FIG. 1, the multilayer material may comprise a set of substrates 16, generally of a lower refractive index, upon each of which is deposited a thin film 14 of material generally having a higher index of refraction. Generally, at least one of the layers 14 or 16 of the multilayer material has an optical thickness equivalent to a quarter wavelength of the light incident upon it.

Referring back to FIG. 2, a reflecting plate 32, disposed substantially parallel to, and of substantially the same dimensions as, the layers 14 and 16 of the beam splitter, has a totally internally reflecting surface on that one of its surfaces which is adjacent to the layers, so that an incident beam 26 on that surface is reflected parallel to the incident light 24.

A first quarter-wave plate 34 is disposed perpendicularly to the plane of symmetry 22 so as to intercept the light transmitted by the layers 14 and 16 of the beam splitter, the fast axis of the plate making an angle of 45° with respect to the plane of polarization of the transmitted light 28. A second quarter-wave plate 36 is disposed adjacent and parallel to the first quarter-wave plate 34, so as to intercept the light 26R reflected by the reflecting plate 32, the fast axis of the second plate making an angle of 45° with respect to the plane of polarization of the reflected light. The result is that light 38 emerging from both quarter wave plates 34 and 36 is circularly polarized light of the same handedness.

The above elements, properly supported, provide a minimal number of elements which would convert unpolarized light 24 into circularly polarized light 38. It will be noted that all of the elements thus far recited appear in FIG. 2 above the plane of symmetry 22.

On an embodiment actually built, the elements symmetrically disposed about the plane of symmetry 22, shown in FIG. 2, but below the plane of symmetry, were also used. Accordingly, the light polarizer 20 may further comprise a second polarizing beam splitter comprising layers 14 and 16 below the plane of symmetry 22; a second reflecting plate 41; and a third quarter-wave plate 46, for reflected light; all three elements being substantially identical to the corresponding first-named elements.

In the embodiment 20, the quarter-wave plate 34 was made wide enough to intercept all of the light transmitted by the layers 14 and 16 of both the first and second beam splitters.

Figure 4:
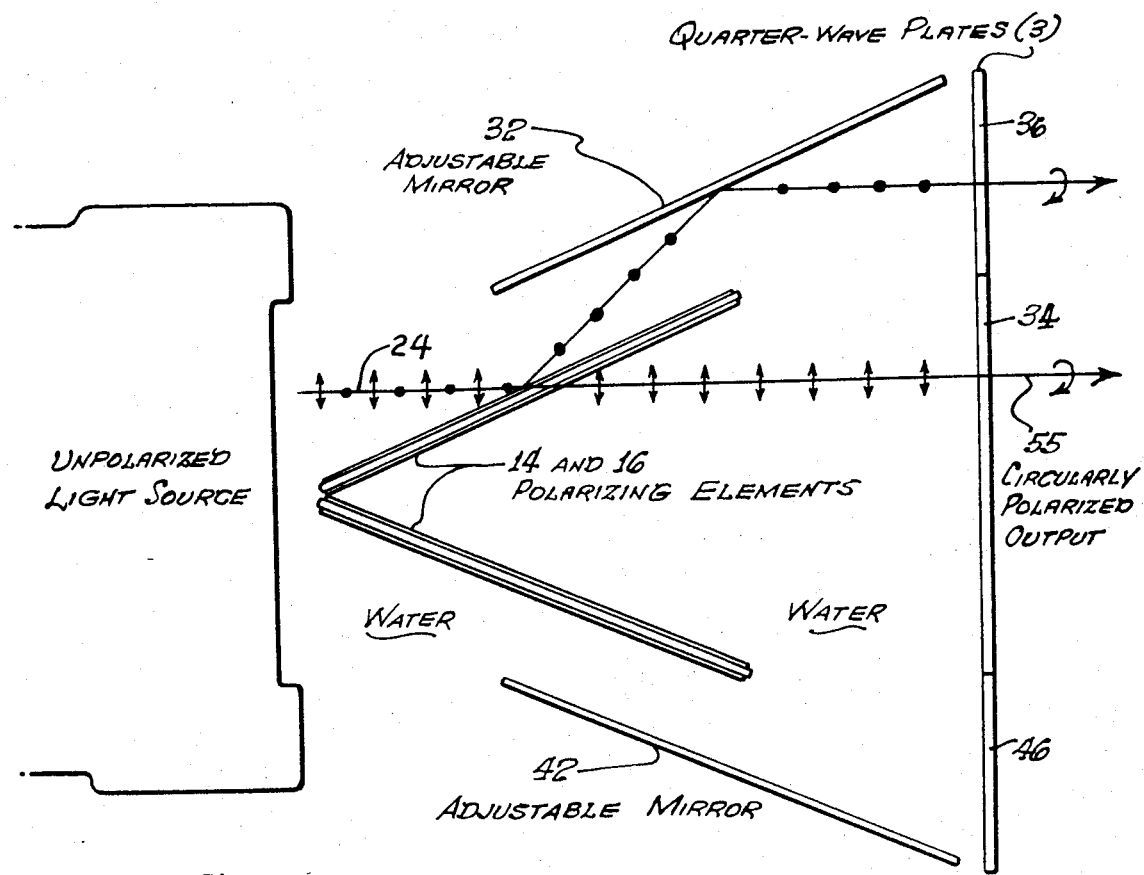
FIG. 4 is a side view of the elements of a prism-less circular polarizer.

The elements thus far recited were used in an experimental, free-flooding model for underwater use, as is shown perhaps more clearly in FIG. 4.

To reduce reflection losses at the entrance face, the light polarizer 20 further comprises a sheet of transparent material 52 disposed perpendicularly to the plane of symmetry 22 on that side of the beam splitters, 14 and 16, and reflecting plates, 32 and 42, where the unpolarized light 24 is incident; and an anti-reflecting coating 54 disposed on that surface of the sheet of transparent material 56 where the impinging unpolarized light emerges.

To reduce reflection losses at the exit face, the light polarizer 20 further comprises a second sheet of transparent material 56, disposed perpendicularly to the plane of symmetry 22, adjacent to the quarter-wave plates, 36, 34 and 46, on that side of the quarter-wave plates where the circularly polarized light 55 emerges; and a second anti-reflecting coating 58 disposed on that surface of the sheet of transparent material where the circularly polarized light emerges.

The light polarizer 20 further comprises two prisms, 62 and 64, each having a cross section in the shape of a parallelogram in a plane perpendicular to the plane of symmetry 22. One prism 62 is disposed between anti-reflecting coating 54 and quarter-wave plate 36, while the other prism 64 is disposed between the anti-reflecting coating 54 and quarter-wave plate 46. A triangular prism 66 is disposed between the layers 14 and 16 of the two beam splitters and quarter-wave plate 34.

It should be noted that, when prisms 62 and 64 are utilized, totally reflecting plates 32 and 42 are not required, except possibly for support, since the suitable surfaces of the prisms could be totally internally reflecting.

Figure 3:
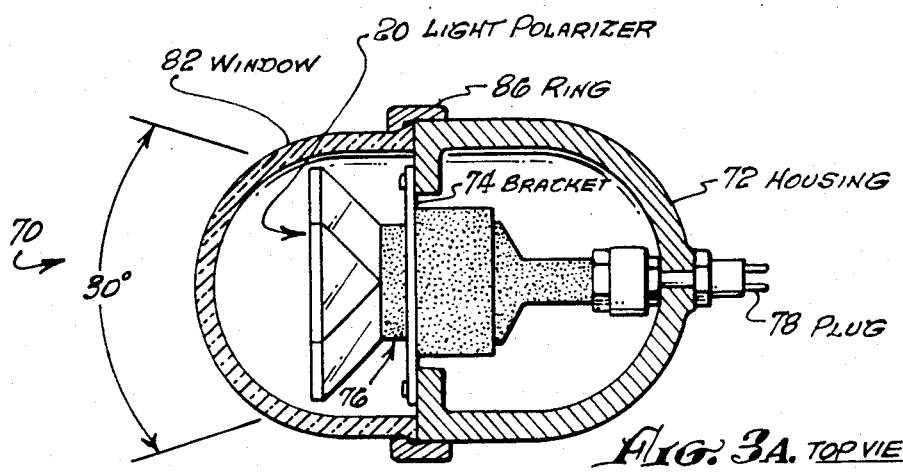
FIG. 3 is a pair of cross-sectional views of a circularly-polarized light source of this invention which includes the circular light polarizer, FIG. 3A being a plan view, and FIG. 3B being a side view.
Figure 3:
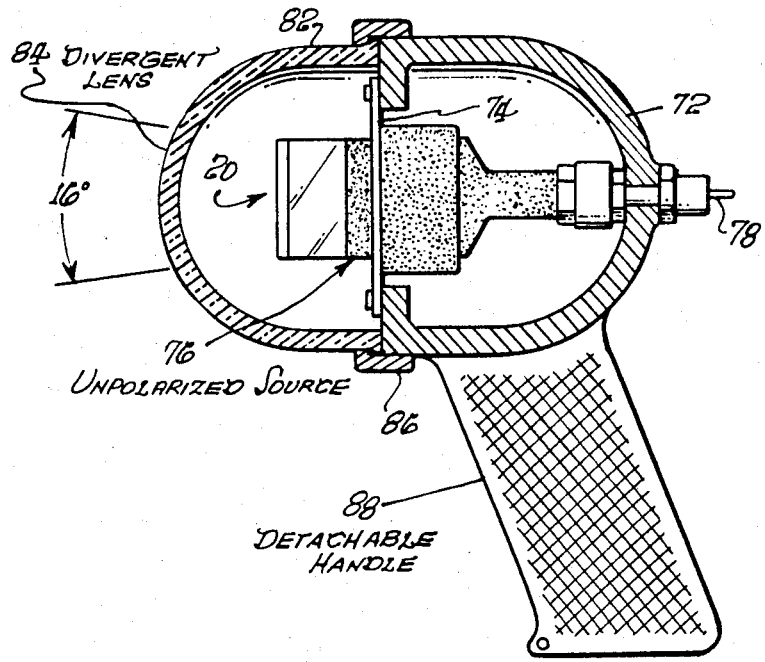

The light polarizer 20 described thus far was used in an underwater light source 70, shown in FIG. 3. The light source 70 includes a housing 72 for supporting the light polarizer 20. When used underwater, the light polarizer 20 would require a pressure housing 72. A bracket 74, to which the light polarizer 20 is attached, is connected to the housing 72.

A source of unpolarized light 76, aligned with the light polarizer 20, is connectable to a source of electrical energy, for example by plug 78, and also attached to the bracket 74. In one embodiment, the light source used was a Birns and Sawyer No. 5595A SeARC underwater light, which requires a 300-watt power input and has a measured (in-air) luminous center-beam intensity of approximately 65,000 cd.

A window 82 of transparent material, disposed flush against the housing 72, passes the polarized light. The window 82 may have a dome-shaped configuration such that light emitted by the light source 20 is slightly divergent through at least a portion of the window, which serves the function of a lens 84. If more, or less, divergence is required, a suitable lens, not shown, could be placed in front of the polarizer 20.

The circularly-polarized light source 70 further comprises a ring 86, fitting snugly against and encircling the junction of the window 82 and housing 72 so as to form a watertight connection, thereby making the light source suitable for underwater use. A handle 88, attached to the housing 72, makes the light source 70 portable.

One alternative is produced by removing the upper and lower quarterwave plates, 36 and 46 in FIG. 2, and replacing the central quarterwave 34 plate with a half-wave plate. In this configuration the output will be linearly polarized.

Another alternative would be to use birefringent materials to separate the polarized components 26 and 28. A suitably modified Ahrens polarizer, for example, could be used for this purpose.

The primary advantages and new features of this device are: (1) The increased efficiency in converting unpolarized light to circularly polarized light. With present methods the polarization efficiency is approximately 20 – 35 percent, whereas the polarization efficiency of this invention will be nearly 100 percent. (2) The polarizer can withstand much higher temperatures than the dichroic type, thus allowing it to be used with high-powered light sources. (3) The polarized light source may be operated in air or in an underwater environment. (4) The output pattern of illumination can easily be changed, by changing the lens, to fit various illumination needs. (5) The housing incorporates a spherical transparent dome window, which is the optimum shape to withstand external pressures. (6) The same basic unit could be used either by divers, in a hand-held or head-mounted configuration, or as a source of illumination for submersible vehicles.

Obviously many modifications and variations of the present invention are possible in the light of the above teachings. It is therefore to be understood that within the scope of the appended claims the invention may be practiced otherwise than as specifically described.

What is claimed is:

1. A portable illuminating light source, comprising:
   a light polarizer which comprises:
      a pair of polarizing beam splitters, in the form of transparent parallel layers, each beam splitter making an acute angle with a vertical reference plane of symmetry such that unpolarized, incident light, parallel to the plane of symmetry, becomes polarized and is half reflected by each of the beam splitters, so that the plane of polarization of the reflected light is parallel to the plane of symmetry, and half transmitted through the beam splitter, with the plane of polarization perpendicular to the plane of symmetry;
      a pair of reflecting plates, each disposed substantially parallel to, and of substantially the same dimensions as, the beam splitters, having a totally internally reflecting surface on that one of its surfaces which is adjacent to the beam splitter, so that an incident beam on that surface is reflected parallel to the incident light;
      a first quarter-wave plate disposed perpendicularly to the plane of symmetry so as to intercept the light transmitted by the beam splitter, the fast axis of the plate making an angle of 45° with respect to the plane of polarization of the transmitted light; and
      second and third quarter-wave plates, disposed adjacent and parallel to the first quarter-wave plate, so as to intercept the light reflected by the reflecting plates, the fast axis of the second and third plates making an angle of 45° with respect to the plane of polarization of the reflected light;
      with the result that any light emerging from both quarter wave plates is circularly polarized light of the same handedness;
   a housing, for supporting the light polarizer;
   a handle, attached to the housing;
   a bracket, to which the light polarizer is attached, connected to the housing;
   a source of unpolarized light, aligned with the light polarizer, connectable to a source of electrical energy, and also attached to the bracket; and
   a window of transparent material, disposed flush against and attached to the housing, for passing the polarized light; the combination providing a circularly-polarized light source.

2. The light source according to claim 1, wherein each of the beam splitters of the light polarizer comprises a multilayer material wherein each layer consists of a material having a different index of refraction from a layer adjacent to it.

3. The light source according to claim 2, wherein the multilayer material comprises a set of substrates, generally of a low refractive index, upon each of which is deposited a film of material, generally having a higher index of refraction.

4. The light source according to claim 3, wherein at least one of the layers of the multilayer material has an optical thickness equivalent to a quarter wavelength of the light incident upon it.

5. The light source according to claim 4, wherein all of the layers of the multilayer material have an optical thickness equivalent to a quarter wavelength of the light incident upon it; and wherein the angle that the beam splitter makes with the plane of symmetry is approximately 45°.

6. The light source according to claim 5, further comprising:
   a sheet of transparent material disposed perpendicularly to the plane of symmetry adjacent to the beam splitters and the reflecting plates, on that side of the beam splitters and reflecting plates where the unpolarized light is incident;
   an anti-reflecting coating disposed on that surface of the sheet of transparent material where the impinging unpolarized light emerges.

7. The light source according to claim 6, further comprising:
   a second sheet of transparent material, disposed perpendicularly to the plane of symmetry adjacent to the quarter-wave plates, on that side of the quarter-wave plate where the circularly polarized light emerges; and
   a second anti-reflecting coating disposed on that surface of the sheet of transparent material where the circularly polarized light emerges.

8. The light source according to claim 7, further comprising:
   two prisms, each having a cross section in the shape of a parallelogram in a plane perpendicular to the plane of symmetry;

one prism being disposed between the first-named anti-reflecting coating and second-named quarter-wave plate;

the other prism being disposed between the first-named anti-reflecting coating and the third quarter-wave plate; and a triangular prism disposed between the two beam splitters and the first-named quarter-wave plate.

9. The circularly-polarized light source according to claim 8, wherein the window has a configuration such that light emitted by the light source is slightly divergent through at least a portion of the window.

10. The circularly-polarized light source according to claim 9, further comprising:

a ring fitting snugly against and encircling the junction of the lens and housing so as to form a watertight connection, thereby making the light source suitable for underwater use.

* * * * *